(12) United States Patent
Sutou (10) Patent No.: US 8,607,029 B2
(45) Date of Patent: Dec. 10, 2013

(54) DYNAMIC RECONFIGURABLE CIRCUIT WITH A PLURALITY OF PROCESSING ELEMENTS, DATA NETWORK, CONFIGURATION MEMORY, AND IMMEDIATE VALUE NETWORK

(75) Inventor: Shin-ichi Sutou, Kawasaki (JP)

(73) Assignee: Fujitsu Semiconductor Limited, Yokohama (JP)

(*) Notice: Subject to any disclaimer, the term of this patent is extended or adjusted under 35 U.S.C. 154(b) by 708 days.

(21) Appl. No.: 12/335,773

(22) Filed: Dec. 16, 2008

(65) Prior Publication Data

US 2009/0172352 A1   Jul. 2, 2009

(30) Foreign Application Priority Data

Dec. 26, 2007   (JP) .................................. 2007-334498

(51) Int. Cl.
*G06F 15/00*   (2006.01)
(52) U.S. Cl.
USPC .................................. 712/11; 712/15; 712/16
(58) Field of Classification Search
None
See application file for complete search history.

(56) References Cited

U.S. PATENT DOCUMENTS

| 4,748,585 | A * | 5/1988 | Chiarulli et al. | 712/15 |
|---|---|---|---|---|
| 5,915,123 | A * | 6/1999 | Mirsky et al. | 712/16 |
| 5,956,518 | A * | 9/1999 | DeHon et al. | 712/15 |
| 6,266,760 | B1 * | 7/2001 | DeHon et al. | 712/15 |
| 6,353,841 | B1 * | 3/2002 | Marshall et al. | 708/232 |
| 6,496,918 | B1 * | 12/2002 | DeHon et al. | 712/15 |
| 6,684,318 | B2 * | 1/2004 | DeHon et al. | 712/15 |
| 7,266,672 | B2 * | 9/2007 | Mirsky et al. | 712/15 |
| 7,433,909 | B2 * | 10/2008 | Scheuermann | 708/400 |
| 7,580,963 | B2 * | 8/2009 | Kawano et al. | 708/230 |
| 2006/0004979 | A1 * | 1/2006 | Kawano et al. | 711/170 |
| 2006/0004991 | A1 * | 1/2006 | Kawano et al. | 712/226 |
| 2006/0218378 | A1 * | 9/2006 | Kudo | 712/208 |
| 2007/0044065 | A1 * | 2/2007 | Imafuku | 716/17 |
| 2007/0230336 | A1 * | 10/2007 | Hanai et al. | 370/230 |
| 2008/0263334 | A1 * | 10/2008 | Synder et al. | 712/221 |
| 2009/0045838 | A1 * | 2/2009 | Fujisawa | 326/38 |

FOREIGN PATENT DOCUMENTS

| JP | 2004-221996 | 8/2004 |
|---|---|---|
| JP | 2005-275455 | 10/2005 |
| JP | 2005-277673 | 10/2005 |

* cited by examiner

*Primary Examiner* — Keith Vicary
(74) *Attorney, Agent, or Firm* — Staas & Halsey LLP (57) ABSTRACT

A dynamic reconfigurable circuit including a plurality of processing elements each provided with an arithmetic data input port, a configuration data input port and an output port, a data network that is coupled to the arithmetic data input ports and the output ports of the plurality of processing elements, a configuration memory that is coupled via a configuration path to the configuration data input port of a first processor element being at least one of the plurality of processing elements, and an immediate value network that is independent from the data network and that is coupled to the configuration data input port of a second processor element being at least one of the plurality of processing elements. An internal register of a third processor element is coupled to the immediate value network so that data stored in the internal register can be outputted to the immediate value network.

10 Claims, 6 Drawing Sheets

DYNAMIC RECONFIGURABLE CIRCUIT WITH A PLURALITY OF PROCESSING ELEMENTS, DATA NETWORK, CONFIGURATION MEMORY, AND IMMEDIATE VALUE NETWORK

CROSS-REFERENCE TO RELATED APPLICATIONS

This application is based upon and claims the benefit of priority from the prior Japanese Patent Application No. 2007-334498 filed on Dec. 26, 2007, the entire contents of that are incorporated herein by reference.

BACKGROUND

1. Field

The present invention generally relates to an electrical circuit, and more particularly to a reconfigurable circuit which can be dynamically reconfigured.

2. Description of Related Art

In a dynamic reconfigurable circuit using processing elements, multiple processing elements are arranged in an array manner and connected to each other by a data network disposed vertically and horizontally. The arithmetic function of the processing elements and the connection relationship between the processing elements made via the network are set so as to be reconfigurable by software. Around the processor element array section, there are provided a configuration memory that stores configuration data on the processor element array section, a controller that controls switching of dynamic reconfiguration, and the like.

In the dynamic reconfigurable circuit having the above configuration, the basic component of the reconfigurable structure is a processor element. Thus, as compared to a FPGA (Field Programmable Gate Array) using a single gate or the like as its basic component, the dynamic reconfigurable circuit has considerably great granularity (modifiable unit size). Further, since the processing elements are arranged in an array manner, arithmetic operations can be executed in parallel, thus allowing high-speed execution of a heavy arithmetic processing, such as complex computation and product sum computation.

There are two different methods for supplying an immediate value (a fixed value specified in the program) to a processor element of the dynamic reconfigurable circuit. According to the first method, an immediate value is preliminarily stored in a data register connected to the data network and then supplied from the data register through the data network to a data input port of the processor element. According to the second method, an immediate value is defined and set as part of configuration data stored in the configuration memory, and then supplied from the configuration memory to an configuration data input port of the processor element.

According to the first method, the data network is used to supply an immediate value to the processor element. The number of connections between the processing elements that can be connected to each other via the data network is limited according to the data network configuration. When part of the data network is used to supply an immediate value, the upper limit number of connections between the processing elements decreases. That is, the modifiable-connection performance is lowered due to the data network resource consumption, and data transfer between the processing elements is affected. As such, necessary data may not be transferred.

According to the second method, immediate values in configuration data are defined and set for each processor element. Accordingly, when multiple processing elements use the same immediate value, the immediate values corresponding to the multiple processing elements must be defined and set in the configuration data in a repeated manner. Further, the immediate value set in configuration data is fixed. While the dynamic reconfigurable circuit operates according to the configuration data, the immediate value cannot be varied.

SUMMARY

According to various embodiments, a dynamic reconfigurable circuit includes multiple processing elements each provided with an arithmetic data input port, a configuration data input port and an output port, a data network that is coupled to each of the arithmetic data input ports and each of the output ports of the multiple processing elements, a configuration memory that is coupled via a configuration path to the configuration data input port of a first processor element being at least one of the multiple processing elements, and an immediate value network that is independent from the data network and that is coupled to the configuration data input port of a second processor element being at least one of the multiple processing elements. Furthermore, an internal register of a third processor element being at least one of the multiple processing elements is coupled to the immediate value network so that data stored in the internal register can be outputted to the immediate value network.

DESCRIPTION OF THE PREFERRED EMBODIMENTS

An embodiment will be described in detail with reference to the accompanying drawings.

Figure 1:
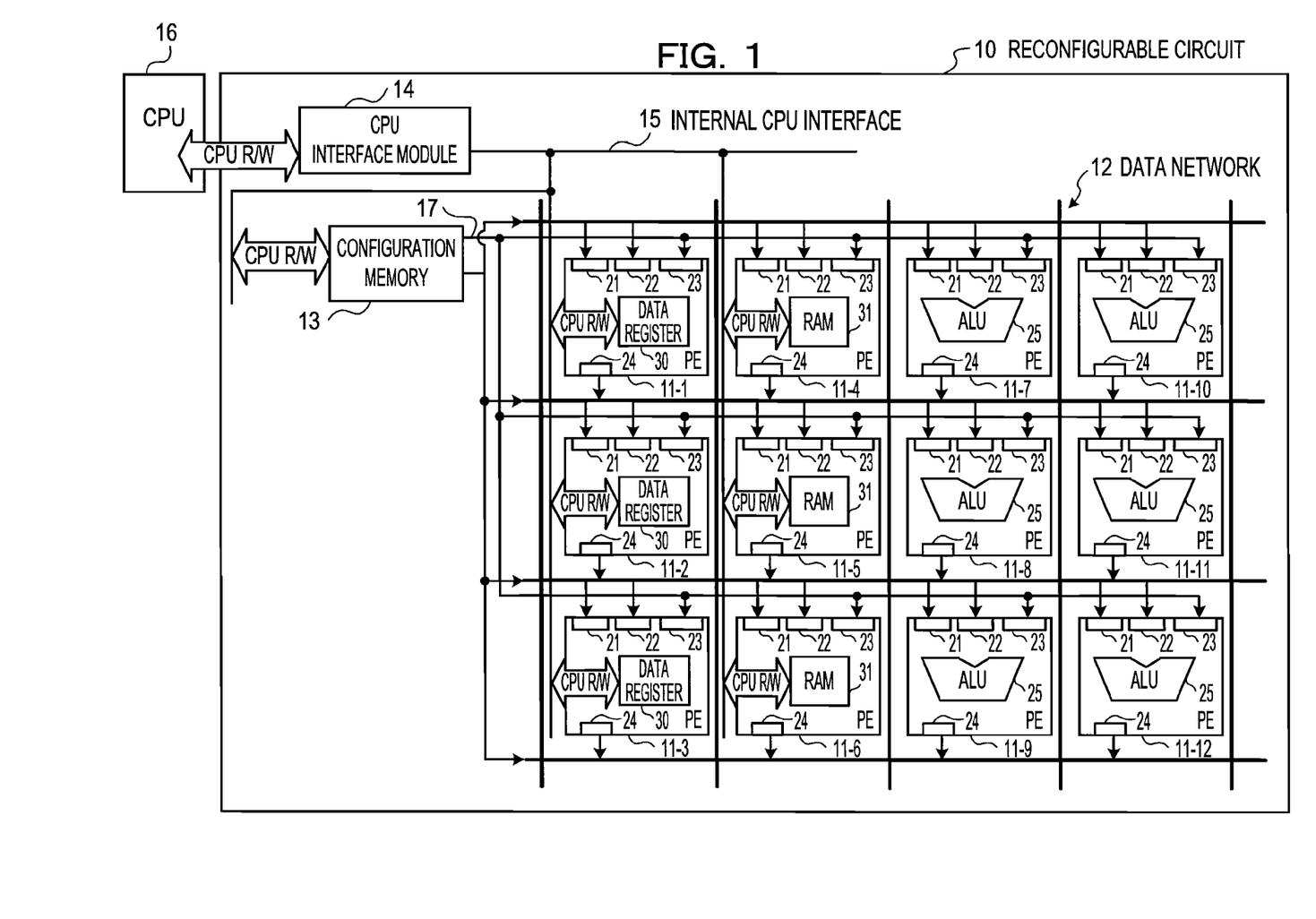
FIG. 1 is a view illustrating an exemplary configuration of a dynamic reconfigurable circuit according to an embodiment.

FIG. 1 is a view illustrating an exemplary configuration of a dynamic reconfigurable circuit according to the present embodiment. A dynamic reconfigurable circuit of FIG. 1 includes multiple processing elements (PE) 11-1 to 11-12, each provided with arithmetic data input ports 21 and 22, a configuration data input port 23 and output port 24, and a data network 12 that is coupled to the arithmetic data input ports 21 and 22 and the output ports 24 of the multiple processing elements 11-1 to 11-12. The dynamic reconfigurable circuit 10 further includes a configuration memory 13 that is coupled via a configuration path 17 to the configuration data input ports 23 of the multiple processing elements 11-1 to 11-12, a CPU interface module 14, and an internal CPU interface 15. The CPU interface module 14 of the dynamic reconfigurable circuit 10 is connected to an external CPU 16 and sends or receives a signal to/from the external CPU 16. A command and data received from the CPU by the CPU interface module 14 are supplied via the internal CPU interface 15 to the configuration memory 13 and part of the processing elements.

The processing elements 11-1 to 11-3 are each a data register element including an internal register 30. The processing elements 11-4 to 11-6 are each a data memory element including an internal memory 31. The internal memory 31 is a storage device capable of storing multiple pieces of data according to address specification, but is substantially the same register device as the internal register 30 from a viewpoint of the data storage function. In the following descriptions, unless particularly specified, the internal register 30 and internal memory 31 are referred to collectively as an internal register. The external CPU 16 can write or read register contents via the internal CPU interface 15 into/from the internal registers 30 and 31.

The processing elements 11-7 to 11-12 are each an arithmetic processing element including an arithmetic and logic unit (hereinafter referred to as ALU) 25. In the ALU 25, the arithmetic function of the processor is set according to configuration data inputted to the configuration data input port 23, and the set arithmetic operation is executed. Referring to the example of FIG. 1, the processing elements 11-1 to 11-12 are arranged in a 3×4 matrix; but the total number of processing elements and the number of lines and columns are not limited thereto.

The configuration memory 13 stores configuration data used to set the configuration of the dynamic reconfigurable circuit 10. The external CPU 16 stores this configuration data via the CPU interface module 14 and internal CPU interface 15 into the configuration memory 13. The configuration data is used to set the arithmetic function of a processor element and, at the same time, to set the interconnection through the data network 12 between the processing elements 11-1 and 11-12, i.e., the connection state of the data network 12. In the dynamic reconfigurable circuit 10 according to the present embodiment, an immediate value is, as described later, set through a dedicated immediate value network.

Figure 2:
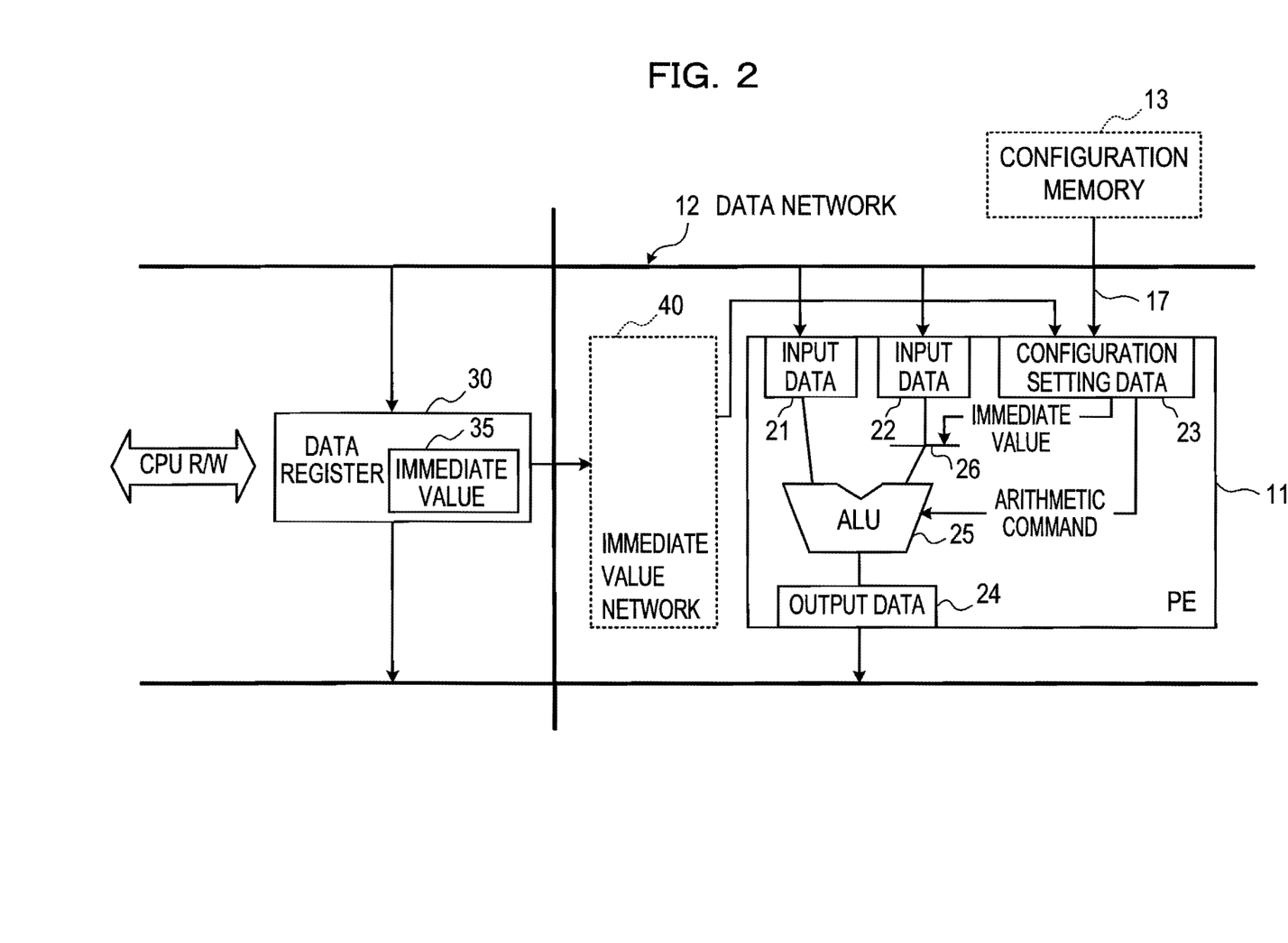
FIG. 2 is a view illustrating an exemplary configuration of setting an immediate value via an immediate value network.

FIG. 2 is a view illustrating an exemplary configuration of setting an immediate value via the immediate value network. In FIG. 2, the same reference numerals are applied to constituent components corresponding to those of FIG. 1, and an explanation thereof is omitted.

As illustrated in FIG. 2, an immediate value network 40 is independent from the data network 12 and coupled to a configuration data input port 23 of a processor element 11 being one of the multiple processing elements 11-7 to 11-12. Further, the internal register 30 of at least one processor element is coupled to the immediate value network 40, so that data (immediate value 35) stored in the internal register can be outputted to the immediate value network 40. The external CPU 16 writes this stored data (immediate value 35) via the internal CPU interface 15 into the internal register 30. Consequently, while the dynamic reconfigurable circuit 10 operates according to configuration data in the configuration memory 13, the external CPU 16 can rewrite the contents of the internal register 30.

In the example illustrated in FIG. 2, the configuration data input port 23 of the processor element 11 is coupled to both the configuration path 17 and immediate value network 40. In the processor element 11 having, as with this example, the configuration data input port 23 coupled to both the configuration path 17 and immediate value network 40, its arithmetic function is selected according to data supplied via configuration path 17 from the configuration memory 13, and data supplied from the immediate value network 40 is used as an immediate value to perform an arithmetic operation. More specifically, for example, the configuration data input port 23 has a 40-bit configuration and 32 bits of the 40 bits constitute data for setting an arithmetic function and the remaining 8 bits constitute data for specifying an immediate value. In this case, the 32 bits are coupled to the configuration path 17 and the 8 bits are coupled to the immediate value network 40. For example, assume that the 32-bit data supplied via the configuration path 17 from the configuration memory 13 specifies addition of input data A, supplied from the arithmetic data input port 21, and the immediate value, and the 8-bit data supplied from the immediate value network 40 is "00101101". In this case, the processor element 11 calculates A+"00101101", and the calculation result is outputted from the output port 24.

The processor element 11 includes arithmetic data input ports 21 and 22, configuration data input port 23, output port 24, ALU 25 and selector 26. The ALU 25 can execute logical operations, such as addition, subtraction and multiplication, and selectively executes one of these logical operations according to configuration data in response to an arithmetic command supplied from configuration data input port 23. The selector 26 is used to select one of input data received from the data network 12 by the arithmetic data input port 22 and an immediate value received from the immediate value network 40 by the configuration data input port 23, and to supply the selected data to the ALU 25. The ALU 25 uses, as input data, the data supplied from the arithmetic data input port 21 and the data supplied from the selector 26, and thereby executes the arithmetic operation specified by the arithmetic command supplied from the configuration data input port 23. The processing elements 11-7 to 11-12 each may have a configuration similar to that of the processor element 11 illustrated in FIG. 2.

Figure 3:
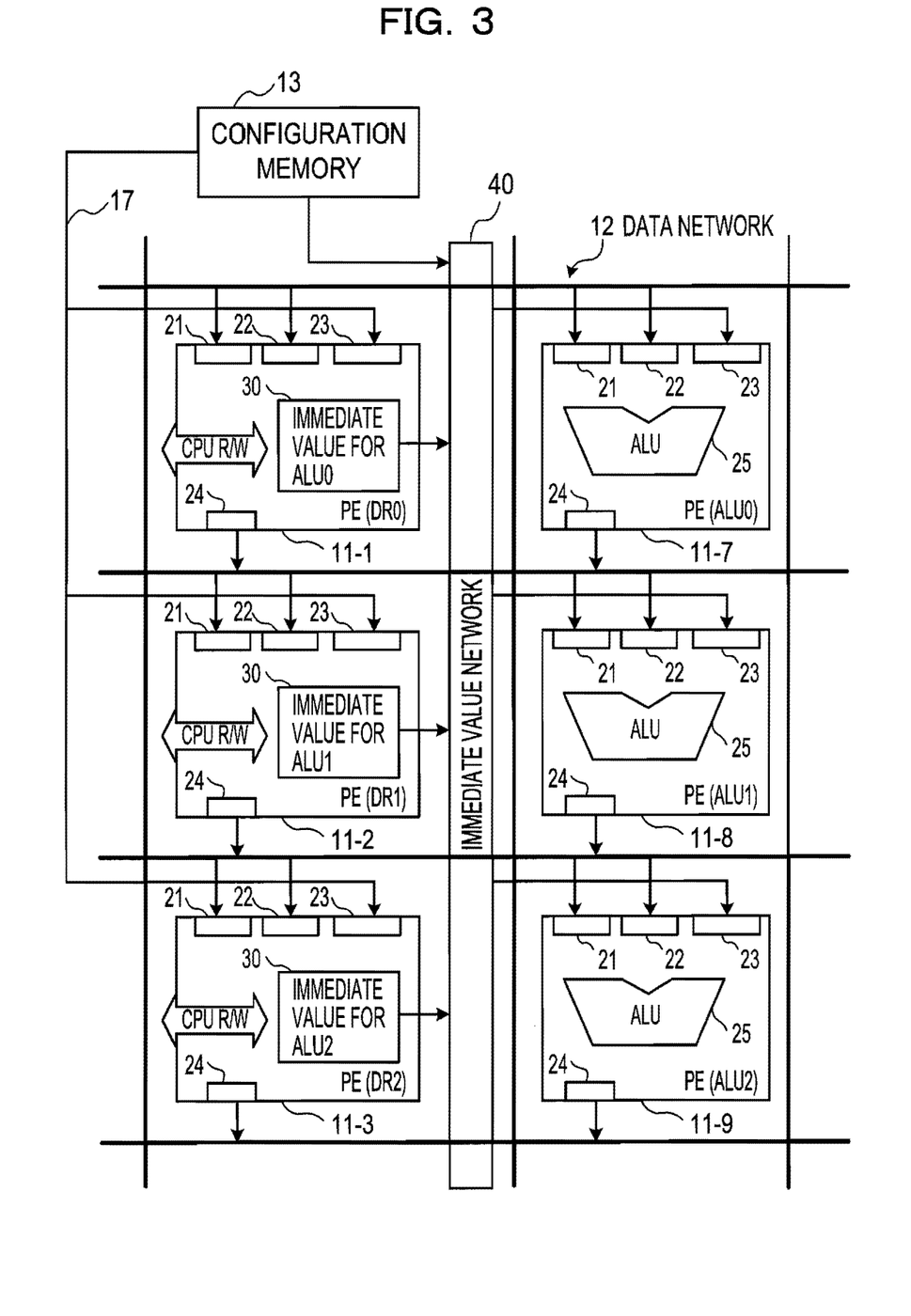
FIG. 3 is a view illustrating an example of connection relationship of the immediate value network.

FIG. 3 is a view illustrating an example of connection relationship of the immediate value network 40. In FIG. 3, the same reference numerals are applied to constituent components corresponding to those of FIG. 1, and an explanation thereof is omitted.

Referring to FIG. 3, the immediate value network 40 is connected to the configuration data input ports 23 of multiple processing elements 11-7 to 11-9 (ALU 0 to ALU 2). Further, the internal registers 30 of the processing elements 11-1 to 11-3 are coupled to the immediate value network 40, so that data (immediate value) stored in the internal registers can be outputted to the immediate value network 40.

In the example of FIG. 3, the internal register 30 of the processor element 11-1 stores an immediate value for the processor element 11-7 (ALU 0), the internal register 30 of the processor element 11-2 stores an immediate value for the processor element 11-8 (ALU 1), and the internal register 30 of the processor element 11-3 stores an immediate value for the processor element 11-9 (ALU 2). The external CPU 16 writes these immediate values, via the internal CPU interface 15, into the internal registers 30. Consequently, while the dynamic reconfigurable circuit 10 operates according to configuration data in the configuration memory 13, the external CPU 16 can rewrite the contents of the internal registers 30.

The immediate value network 40 can change interconnection between the processing elements. More specifically, the interconnection through the immediate value network 40 can be set according to data stored in the configuration memory 13. In the example of FIG. 3, the internal register 30 of the processor element 11-1 is coupled to the configuration data input port 23 of the processor element 11-7, the internal register 30 of the processor element 11-2 is coupled to the configuration data input port 23 of the processor element 11-8, and the internal register 30 of the processor element 11-3 is coupled to the configuration data input port 23 of the processor element 11-9. In this way, the coupling is set through the immediate value network 40.

The coupling setting through the immediate value network 40 is not limited to the above example. For example, the coupling may be set through the immediate value network 40 so that the internal register 30 of the processor element 11-1 is coupled to the configuration data input ports 23 of the three processing elements 11-7 to 11-9. In this case, the three processing elements 11-7 to 11-9 shares the contents of the one internal register 30 as the immediate value.

In the example of FIG. 3, the configuration data input ports 23 of the processing elements 11-7 to 11-9 are coupled only to the immediate value network 40 and not to the configuration path 17. The processing elements 11-7 to 11-9 having, as with this example, the configuration data input port 23 coupled only to the immediate value network 40 select an arithmetic function thereof according to data supplied from the immediate value network 40 and use second data supplied from the immediate value network 40 as an immediate value to perform an arithmetic operation. More specifically, for example, the configuration data input port 23 has a 40-bit configuration, and all of the 40 bits are coupled to the immediate value network 40, and 32 bits of them constitute first data for setting an arithmetic function and the remaining 8 bits constitute second data for specifying an immediate value. The first data composed of 32 bits and the second data composed of 8 bits may be stored as 40-bit data in the internal register 30 of one processor element. Alternatively, the first data composed of 32 bits and the second data composed of 8 bits may be supplied from separate processing elements via the immediate value network 40 to one configuration data input port 23. Here, assume that, of the 40-bit data supplied to the configuration data input port 23, the 32-bit data specifies addition of input data A from the arithmetic data input port 21 and the immediate value, and the remaining 8-bit data is "00101101". In this case, the processor element calculates A+"00101101", and outputs the calculation result via the output port 24.

Figure 4:
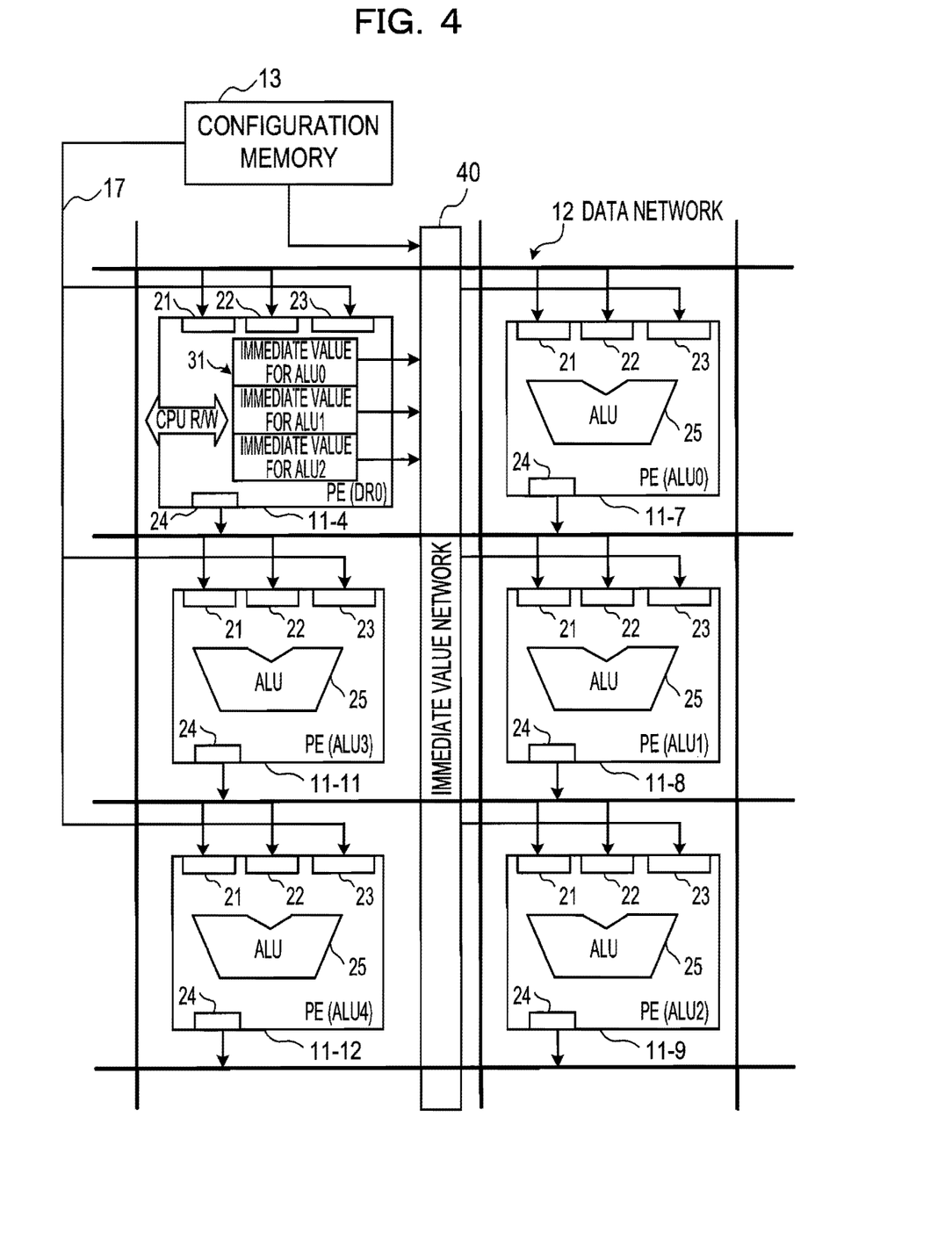
FIG. 4 is a view illustrating an example of connection relationship of the immediate value network when a register having a file structure is used.

FIG. 4 is a view illustrating an example of connection relationship of the immediate value network 40 when a register having a file structure is used. In the example of FIG. 4, the immediate value network 40 is coupled to the configuration data input ports 23 of the multiple processing elements 11-7 to 11-9 (ALU 0 to ALU 2), and 11-11 and 11-12 (ALU 3 and ALU 4). Further, an internal register 31 of the processor element 11-4 is coupled to the immediate value network 40, so that data (immediate value) stored in the internal register can be outputted to the immediate value network 40.

In the example of FIG. 4, in the internal register 31 of the processor element 11-4, multiple immediate values are filed and stored in respective addresses. In this case, as illustrated in FIG. 1, RAM or the like may be used as the internal register (internal memory) 31. In the internal memory 31, the immediate value for the processor element 11-7 (ALU 0) is stored in a first address, the immediate value for the processor element 11-8 (ALU 1) is stored in a second address, and the immediate value for the processor element 11-9 (ALU 2) is stored in a third address. The external CPU 16 writes these immediate values via the internal CPU interface 15 into respective addresses of the internal memory 31. Consequently, while the dynamic reconfigurable circuit 10 operates according to configuration data in the configuration memory 13, the external CPU 16 can rewrite the contents of the internal register 31.

In the configuration of FIG. 4, multiple immediate values are filed and stored in the single processor element 11-4. Consequently, the number of processing elements for storing immediate values can be reduced, compared to the case in which, as with the configuration of FIG. 3, three processing elements are used to define three immediate values. As a result, the number of processing elements for arithmetic operation can be increased, so that the arithmetic processing performance is improved.

The immediate value network 40 can change interconnection between the processing elements. More specifically, the interconnection through the immediate value network 40 can be set according to data stored in the configuration memory 13. In the example illustrated in FIG. 4, the file data in the first address of the internal memory 31 is supplied to the configuration data input port 23 of the processor element 11-7, the file data in the second address of the internal memory 31 is supplied to the configuration data input port 23 of the processor element 11-8, and the file data in the third address of the internal memory 31 is supplied to the configuration data input port 23 of the processor element 11-9. In this way, the coupling is set through the immediate value network 40.

The coupling setting through the immediate value network 40 is not limited to the above example. For example, the coupling may be set through the immediate value network 40 so that the file data in the first address of the internal memory 31 is supplied to the configuration data input port 23 of the three processing elements 11-7 to 11-9. In this case, the three processing elements 11-7 to 11-9 shares the first-address data in the internal memory 31 as the immediate value.

In the example of FIG. 4, the configuration data input ports 23 of the processing elements 11-7 to 11-9 are, as with the example of FIG. 3, coupled only to the immediate value network 40 and not to the configuration path 17. Consequently, the processing elements 11-7 to 11-9 each select an arithmetic function according to the first data supplied from the immediate value network 40, and use the second data supplied from the immediate value network 40 as an immediate value to perform an arithmetic operation. Further, in the example of FIG. 4, the configuration data input ports 23 of the processing elements 11-11 and 11-12 are coupled only to the configuration path 17 and not to the immediate value network 40. In this case, the processing elements 11-11 and 11-12 are used exclusively for arithmetic operations using no immediate value. Alternatively, the configuration data input ports 23 of the processing elements 11-11 and 11-12 may be, as illustrated in FIG. 2, coupled to both the configuration path 17 and immediate value network 40.

The formula calculation processing by the dynamic reconfigurable circuit 10 will be described with respect to an illustrative example. In the formula calculation processing of this example, arithmetic phases Fn, Fn+1, Fn+2, ... are defined as follows:

$$Fn: \Sigma1=(A*x)+y+z$$

$$Fn+1: \Sigma2=(B-x)+y+z$$

$$Fn+2: \Sigma3=x+(B*y)+z$$

$$Fn+3: \Sigma4=x+y+(C-z)$$

$$Fn+4: \Sigma5=x+y+(D+z)$$

In Fn+5 and subsequent arithmetic phases, the calculations of $\Sigma1$ to $\Sigma5$ are repeated. Here, A, B, C and D are constant numbers that are stored in the processing elements as immediate values and x, y and z are input data that is appropriately supplied from the data network 12 to the processing elements. For the sake of simplicity, the terms with parenthesis included in the above arithmetic processings are expressed as follows:

$$(A*x)=\alpha 1$$

$$(B-x)=\alpha 1'$$

$$(B*y)=\alpha 2$$

$$(C-z)=\alpha 3$$

$$(D+z)=\alpha 3'$$

For the sake of further simplicity, the addition formulae of x, y and z are expressed as follows:

$$(y+z)=\beta 1$$

$$(x+z)=\beta 2$$

$$(x+y)=\beta 3$$

Using the above expressions, the calculation formulae of each arithmetic phase are expressed as follows:

$$Fn=\alpha 1+\beta 1$$

$$Fn+1=\alpha 1'+\beta 1$$

$$Fn+2=\alpha 2+\beta 2$$

$$Fn+3=\alpha 3+\beta 3$$

$$Fn+4=\alpha 3'+\beta 3$$

Figure 5:
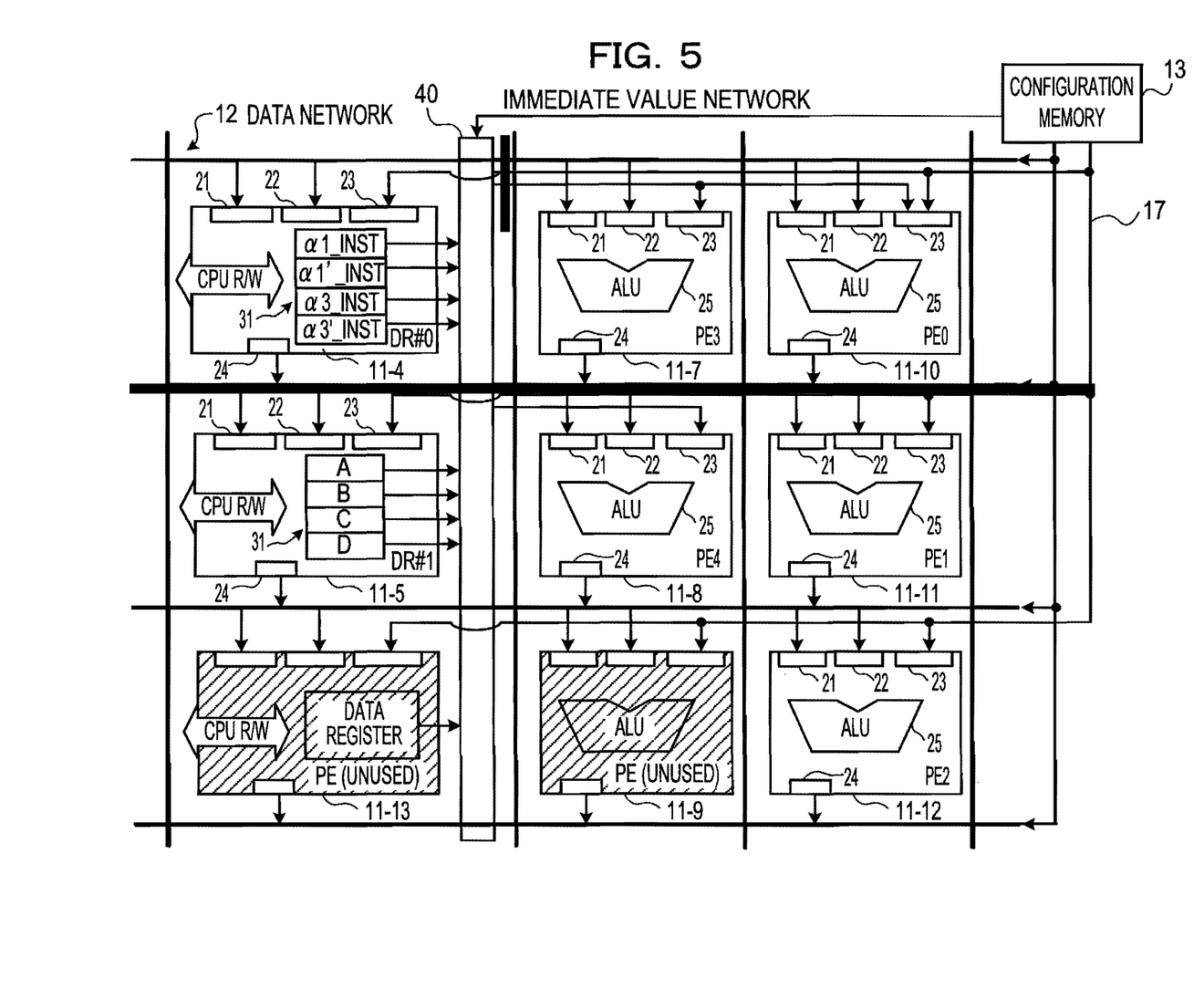
FIG. 5 is a view for explaining processor element assignment when the dynamic reconfigurable circuit executes a formula calculation processing.

FIG. 5 is a view for explaining processor element assignment when the dynamic reconfigurable circuit 10 executes the formula calculation processing. In FIG. 5, the same reference numerals are applied to constituent components corresponding to those of FIG. 1, and an explanation thereof is omitted.

In the configuration of FIG. 5, in the internal register (internal memory) 31 of the processor element 11-4 (DR#0), there are stored: command α1_INST of calculating α1; command α1'_INST of calculating α1'; command α3_INST of calculating α3; and command α3'_INST of calculating α3'. Here, α1, α1', α3 and α3' are notations used in the above formula calculation processing. Further, in the internal memory 31 of the processor element 11-5 (DR#1), there are stored four constants A, B, C and D being immediate values. The data writing of these register values is performed via the internal CPU interface 15 by the external CPU 16.

Figure 6:
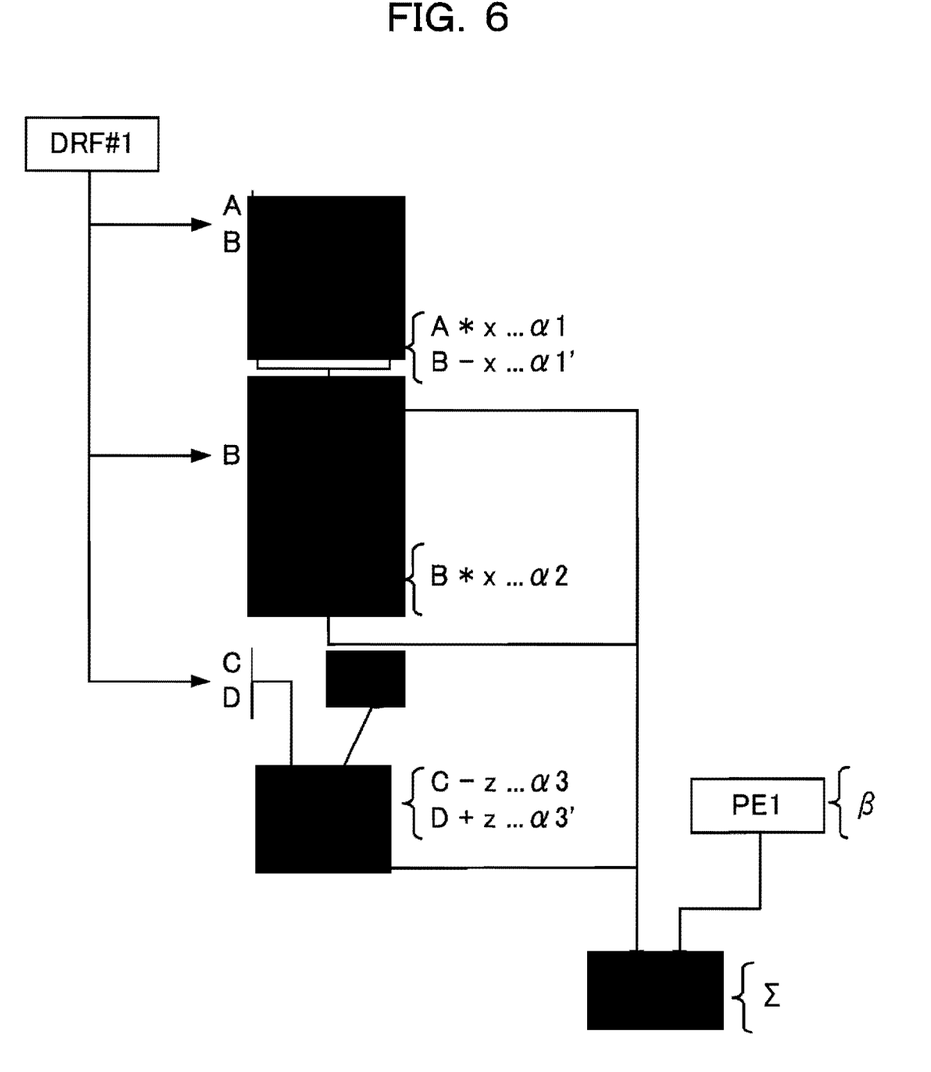
FIG. 6 is a view illustrating a data flow when the dynamic reconfigurable circuit executes a formula calculation processing.

FIG. 6 is a view illustrating a data flow when the dynamic reconfigurable circuit 10 executes the formula calculation processing. The processor element PE3 (processor element 11-7 in FIG. 5) calculates α1 (=A*x) and α1' (=B−x) based on constants A and input data x supplied from the data register DR#1 (processor element 11-5 in FIG. 5). The processor element PE0 (processor element 11-10 in FIG. 5) calculates α2 (=B*y) based on constant A and input data x supplied from the data register DR#1. Further, the processor element PE4 (processor element 11-8 in FIG. 5) calculates α3 (=C−z) and α3' (=D+z) based on constants C and D and input data z supplied from the data register DR#1.

The processor element PE1 (processor element 11-11 in FIG. 5) calculates β1, β2 and β3 based on input data x, y, and z. Here, β1, β2 and β3 are illustrated as β in FIG. 6. Finally, the processor element PE2 (processor element 11-12 in FIG. 5) adds β supplied from PE1 to α. Here, α is one from among α1 and α1' supplied from the processor element PE3, and α2 supplied from the processor element PE0, and α3 and α3' supplied from the processor element PE4. In this way, the processor element PE2 sequentially outputs Σ1 to Σ5 one by one.

In order to execute the arithmetic operation of the data flow illustrated in FIG. 6, in the configuration of FIG. 5 the configuration data stored in the configuration memory 13 contains PE command of causing the processor element 11-10 (PE0) to calculate α2, PE command of causing the processor element 11-11 (PE1) to calculate β, and PE command of causing the processor element 11-12 (PE2) to calculate α+β. This configuration data is supplied from the configuration memory 13 via the configuration path 17 to the processing elements 11-10 to 11-12 and at the same time, via another path to the immediate value network 40 and data network 12. Here, no immediate value is used for the calculation of β by the processor element 11-11 (PE1) and the calculation of α+β by the processor element 11-12 (PE2). Accordingly, the processor element 11-11 (PE1) and processor element 11-12 (PE2) are coupled only to the configuration path 17. For the calculation of α2 by the processor element 11-10 (PE0), immediate value B is used. Accordingly, the processor element 11-10 (PE0) is connected not only to the configuration path 17 but also to the immediate value network 40, so that constant B is received from the processor element 11-5.

In the internal register (internal memory) 31 of the processor element 11-4 (DR#0), there are stored: command α1_INST of calculating α1; command α1'_INST of calculating α1'; command α3_INST of calculating α3; and command α3'_INST of calculating α3'. As described with reference to FIG. 6, the processor element 11-7 (PE3) calculates α1 and α1', and the processor element 11-8 (PE4) calculates α3 and α3'. Accordingly, in arithmetic phase Fn, which requires the calculation of α1, and arithmetic phase Fn+1, which requires the calculation of α1', the processor element 11-4 (DR#0) is connected via the immediate value network 40 to the processor element 11-7 (PE3). The processor element 11-7 (PE3) calculates α1 according to command α1_INST supplied from the immediate value network 40 to the configuration data input port 23, and calculates α1' according to command α1'_INST. In arithmetic phase Fn+3, which requires the calculation of α3, and arithmetic phase Fn+4, which requires the calculation of α3', the processor element 11-4 (DR#0) is connected via the immediate value network 40 to the processor element 11-8 (PE4). The processor element 11-8 (PE4) calculates α3 according to command α3_INST supplied from the immediate value network 40 to the configuration data input port 23, and calculates α3' according to command α3'_INST.

In the above described setting, configuration data is appropriately supplied from the configuration memory 13 via the configuration path 17 to the processing elements 11-10 to 11-12 in each arithmetic phase. In parallel, configuration data are supplied from the configuration memory 13 via another path to the immediate value network 40 and data network 12. Also, the configuration data in the data register is supplied via the immediate value network 40 to the processing elements 11-7, 11-8 and 11-10. Accordingly, the arithmetic function of each processor element, the connection via the data network 12 between each processor element, and the connection via the immediate value network 40 between each processor element are set for each arithmetic phase. In this way, the arithmetic operation for the data flow illustrated in FIG. 6 is implemented by the configuration of FIG. 5.

According to the configuration of FIG. 5, after the calculations of Σ1 to Σ5 have been made in arithmetic phases Fn to Fn+5, constants A, B, C and D in the processor element 11-5 (DR#1) can be rewritten. Accordingly, while the same configuration data is repeatedly used, the calculation can be made using different constant values. Further, after the calculations of Σ1 to Σ5 have been made in arithmetic phases Fn to Fn+5, the arithmetic command of the processor element 11-4 (DR#0) can also be rewritten via the internal CPU interface 15 by the external CPU 16. Accordingly, while the same configuration data in the configuration memory 13 is repeatedly used, it is possible to change only the terms α1, α1', α3 and α3' and execute the arithmetic operation.

The present invention has been described with respect to a specific embodiment. However, it is to be understood that the invention is not limited to the specific embodiment, and many modifications to the embodiment are possible within the scope of the invention, which is defined in the appended claims.

What is claimed is:

1. A dynamic reconfigurable circuit comprising:
a plurality of processing elements each provided with an arithmetic data input port, a configuration data input port and an output port;
a data network that is coupled to each of the arithmetic data input ports and each of the output ports of the plurality of processing elements;
a configuration memory that is coupled via a configuration path to the configuration data input port of a first processor element being at least one of the plurality of processing elements; and
an immediate value network that is independent from the data network and that is directly coupled to the configuration data input port of a second processor element being at least one of the plurality of processing elements,
wherein an internal register of a third processor element being at least one of the plurality of processing elements is coupled to the immediate value network so that data stored in the internal register can be outputted to the immediate value network, and
wherein a path to transfer data from the configuration memory to the second processor element via the immediate value network is independent from a path to transfer input data from an outside of the data network to the second processor element via the data network.

2. The dynamic reconfigurable circuit according to claim 1, wherein the configuration data input port of the second processor element is coupled to both the configuration path and the immediate value network.

3. The dynamic reconfigurable circuit according to claim 2, wherein the second processor element having the configuration data input port coupled to both the configuration path and the immediate value network selects an arithmetic function thereof based on data supplied via the configuration path from the configuration memory and uses data supplied from the immediate value network as an immediate value to perform an arithmetic operation.

4. The dynamic reconfigurable circuit according to claim 1, wherein the configuration data input port of the second processor element is coupled only to the immediate value network and not to the configuration path.

5. The dynamic reconfigurable circuit according to claim 4, wherein the second processor element having the configuration data input port coupled only to the immediate value network selects an arithmetic function thereof based on first data supplied from the immediate value network and uses second data supplied from the immediate value network as an immediate value to perform an arithmetic operation.

6. The dynamic reconfigurable circuit according to claim 1, wherein the configuration data input port of the first processor element is coupled only to the configuration path and not to the immediate value network.

7. The dynamic reconfigurable circuit according to claim 1, wherein no immediate value is stored in the configuration memory.

8. The dynamic reconfigurable circuit according to claim 1, wherein the immediate value network is configured to change an interconnection between the processing elements.

9. The dynamic reconfigurable circuit according to claim 8, wherein the interconnection configured by the immediate value network is set based on data stored in the configuration memory.

10. The dynamic reconfigurable circuit according to claim 1, wherein a plurality of immediate values are stored in different addresses in the internal register of the third processor element.

* * * * *